United States Patent
Bastide et al.

(10) Patent No.: US 9,875,268 B2
(45) Date of Patent: *Jan. 23, 2018

(54) NATURAL LANGUAGE MANAGEMENT OF ONLINE SOCIAL NETWORK CONNECTIONS

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 606 days.

This patent is subject to a terminal disclaimer.

(21) Appl. No.: 14/458,880

(22) Filed: Aug. 13, 2014

(65) Prior Publication Data

US 2016/0048760 A1   Feb. 18, 2016

(51) Int. Cl.
   *G06F 17/30*   (2006.01)
   *G06Q 30/06*   (2012.01)
   (Continued)

(52) U.S. Cl.
   CPC .... *G06F 17/30345* (2013.01); *G06F 17/2765* (2013.01); *G06F 17/28* (2013.01);
   (Continued)

(58) Field of Classification Search
   CPC ............ G06N 5/02; G06N 5/04; G06N 5/048; G06N 7/005; G06F 17/30345;
   (Continued)

(56) References Cited

U.S. PATENT DOCUMENTS

2009/0164926 A1   6/2009   Boyle et al.
2010/0205628 A1*  8/2010   Davis ................ H04M 1/72533
                                                          725/25
(Continued)

OTHER PUBLICATIONS

Martin, T.P., et al., "An Incremental Algorithm to find Asymmetric Word Similarities for Fuzzy Text Mining", Soft Computing as Transdisciplinary Science and Technology Advances in Soft Computing, 2005, vol. 29, pp. 838-847.

(Continued)

*Primary Examiner* — Dave Misir
(74) *Attorney, Agent, or Firm* — Scully, Scott, Murphy & Presser, P.C.; L. Jeffrey Kelly (57) ABSTRACT

Natural language management of online social network connections may comprise receiving natural language data associated with a user's social network interactions. The natural language data associated with a user's social network interactions is analyzed and features used in the user's social network interactions are determined based on the analysis. The contexts in which the features are used in the user's social network interactions may be also determined. Point values to the features used in the user's social network interactions are assigned. A fingerprint of the user is created at least based on the features and the point values. The created fingerprint may be compared with information associated with online communities, and based on the comparison, one or more of the online communities may be recommended as user's potential social network connections.

9 Claims, 3 Drawing Sheets

(51) Int. Cl.
*G06F 17/28* (2006.01)
*G06N 5/04* (2006.01)
*G06F 17/27* (2006.01)
*G06F 9/44* (2006.01)
*G06N 5/02* (2006.01)

(52) U.S. Cl.
CPC .... *G06F 17/3056* (2013.01); *G06F 17/30876* (2013.01); *G06N 5/04* (2013.01); *G06Q 30/0631* (2013.01); *G06F 9/4446* (2013.01); *G06N 5/02* (2013.01)

(58) Field of Classification Search
CPC ............ G06F 17/2765; G06F 17/2705; G06F 17/2785; G06F 17/28; G06F 17/3056; G06F 17/30876; G06F 9/4446; G06Q 30/0631; H04L 67/22; H04L 67/02
USPC .......................................................... 706/11
See application file for complete search history.

(56) References Cited

U.S. PATENT DOCUMENTS

| | | |
|---|---|---|
| 2010/0257028 A1 | 10/2010 | Hillerbrand |
| 2012/0066073 A1 | 3/2012 | Dilip et al. |
| 2012/0158400 A1* | 6/2012 | Schmidt .............. G06F 17/2785 704/9 |
| 2012/0265819 A1 | 10/2012 | Mcgann et al. |
| 2013/0159413 A1 | 6/2013 | Davis et al. |
| 2013/0268516 A1* | 10/2013 | Chaudhri .............. H04L 65/403 707/722 |
| 2015/0350117 A1 | 12/2015 | Bastide et al. |

OTHER PUBLICATIONS

Auto-Antonym, Wikipedia, http://en.wikipedia.org/wiki/Auto-antonym, last modified on Aug. 6, 2014, 4 pages.

Text Mining, Wikipedia, http://en.wikipedia.org/wiki/Text_mining, last modified on Aug. 7, 2014, 9 pages.

List of IBM Patents or Patent Applications Treated as Related, dated Dec. 15, 2016, 2 pages.

Gerlitz, C., et al., "The like economy: the social web in transition", Conference Paper, MIT7: Unstable Platforms, the Promise and Peril of Transition, May 13-May 15, 2011, 26 pages.

Office Action dated Feb. 26, 2016 received in U.S. Appl. No. 14/695,146, pp. 1-13.

List of IBM Patents or Patent Applications Treated as Related dated Dec. 11, 2015, 2 pages.

Notice of Allowance dated Sep. 26, 2017 received in U.S. Appl. No. 15/379,576, 25 pages.

* cited by examiner

NATURAL LANGUAGE MANAGEMENT OF ONLINE SOCIAL NETWORK CONNECTIONS

FIELD

The present application relates generally to computers, and computer applications, and more particularly to natural language management of online social network connections.

BACKGROUND

Online social networks are a universal mechanism to connect people and information in logical and organized ways and enable sharing of information between the members. The most common mechanisms of sharing information on online social networks are the wall, activity stream or timeline. A social networking site wall is a section in a member or user's profile in which others can write messages, engage in open conversations, add social media objects, and allow third parties to post automated updates. An activity stream refers to record of an individual's activities, for example, actions performed on a social media website.

These mechanisms enable a user to engage in a conversation specific to the network of followers and the people who are able to read the discussion. Managing the audience for the conversation on an Online Social Network is an arduous task, where one must add, remove and fine tune the network of followers in order to get the best results for a post and subsequent conversation.

BRIEF SUMMARY

A method for natural language management of online social network connections, in one aspect, may comprise receiving natural language data associated with a user's social network interactions. The method may also comprise analyzing the natural language data associated with a user's social network interactions. The method may further comprise determining features used in the user's social network interactions based on the analysis. The method may further comprise assigning point values to the features used in the user's social network interactions. The method may also comprise creating a fingerprint of the user based on the features and the point values. The method may further comprise comparing the fingerprint with information associated with online communities. The method may also comprise based on the comparing, recommending one or more of the online communities as user's potential social network connections.

A system for natural language management of online social network connections, in one aspect, may comprise a hardware processor operable to receive natural language data associated with a user's social network interactions. The hardware processor may be further operable to analyze the natural language data associated with a user's social network interactions. The hardware processor may be further operable to determine features used in the user's social network interactions based on the analysis. The hardware processor may be further operable to assign point values to the features used in the user's social network interactions. The hardware processor may be further operable to create a fingerprint of the user based on the features and the point values. The hardware processor may be further operable to compare the fingerprint with information associated with online communities, and based on the comparison. The hardware processor may be further operable to recommend one or more of the online communities as user's potential social network connections. A storage device may be operable to store the fingerprint.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A methodology is presented in one embodiment that enhances the ability to automatically manage an online social network. An online social network connection management methodology of the present disclosure in one embodiment may be based on the granular level of knowledge of a user's natural language, e.g., communication style and form. Such methodology may enhance the social computing portfolio and improve the experience of social network connections and management of the connection.

Figure 1:
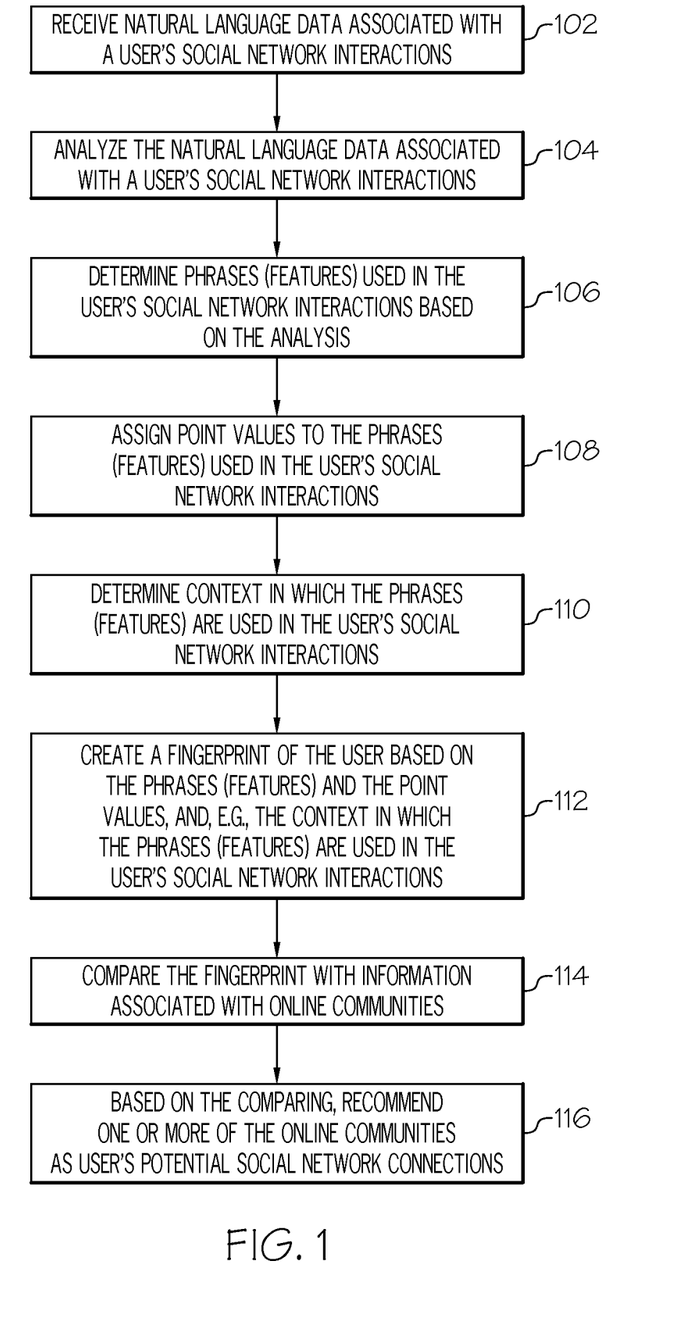
FIG. 1 is a flow diagram illustrating a method of managing online social network connections by natural language management in one embodiment of the present disclosure.

FIG. 1 is a flow diagram illustrating a method of managing online social network connections by natural language management in one embodiment of the present disclosure. A user's social network interactions may be monitored. For instance, an application programming interface (API), a journaling application or another application may be used to connect to a social network application or social network database to access data that is generated or being generated from the user's social network interactions. Social network data may be received at 102 via such API, journaling application or another application. The monitoring may be performed in real-time. Hence, data received may be real-time data. In another aspect, the data may be those already stored in a database associated with the social network application, e.g., past or historical interactions of the user.

At 104, the data of the user's social network interactions are analyzed using data mining and/or natural language processing techniques to create a user's fingerprint, e.g., of languages used by the user. A user's fingerprint may include words or phrases that the user uses, and the context in which the user uses them.

For example, N-Gram natural language processing technique may be used to determine the user's manner of speech, manner of texting, or manner of expressing himself or herself during communications occurring in the social network interactions. Briefly, an N-Gram refers to a sequence of n items from a sequence of text, e.g., the user's social network interactions. N-Grams uncovered in the user's communications are saved as part of the user's fingerprint.

For example, a user during the interaction may use phrases such as "simply because it is", "the embodiment is true" for the first time in a communication. A methodology of the present disclosure in one embodiment converts the phrases into features, for example, such as N-Grams. A methodology of the present disclosure in one embodiment creates a fingerprint of the phrases or features, such as fingerprints from N-Grams, which breaks up the phrases, and assigns a point value to each of the N-Grams. Examples of N-Grams may be "simply-because-it" broken up from the phrase "simply because it is", "embodiment-is-true" broken up from the phrase "the embodiment is true", e.g., which phrases the user used in the social network interactions. Initially, the assigned points can be based on many factors such as the number of times used per conversation(s), who the conversation was with, and the contextual use of the word (e.g., the location where the word was or is used, time of the day the word was or is used such as night versus day, data the word was or is used such as summer versus winter, and/or other contextual use) for example, to distinguish auto-antonyms or words that have the same spelling but different meanings. Such information may be extracted from the analyzed social network interaction data, for example, using natural language analyzer and metadata information associated with the social network interaction data such as the header information of a message that shows the one or more sender and recipients.

In one aspect, the points then may be updated if found in subsequent conversation. For example, frequently used features (phrases) may be higher in weight, e.g., have higher or more points. The points may be updated over time, on demand, or based on a set window of time.

As shown at 106, as an example, data is parsed to determine phrases or phrase elements in the user's social network interaction, e.g., N-Grams or the like. The phrases capture the user's natural language mannerism, for example, how the user may describe a topic. At 108, point values are assigned to the phrases (e.g., N-Grams). In addition, at 110, the context information about the phrases (e.g., N-Grams) is determined by using data analysis techniques. Examples of context information include one or more of the type of social network or media the phrases appear in, recipients of the conversation where the phrases appear, topic of the conversation where the phrases appear, web site (e.g., on the Internet, World Wide Web) where the phrases appear, location of the users of the conversation, time/date, address, subject, and participants of the conversation where the phrases appear.

The phrases, point values assigned to the phrases and, for example, associated context information form a fingerprint of the user. For instance, a fingerprint of the user is created with the phrases and point values assigned to the phrases at 112. The fingerprint of the user may also include associated context information. The fingerprints may be saved, e.g., stored in a storage device. In one aspect, a fingerprint may be considered as a subset of all features in the user's social network interaction.

Fingerprints may also be superimposed so to recommend other phrases. For example, based on different phrases the user uses in the social network interactions, N-Grams may be aggregated to include other words. For instance, in superimposing, the fingerprints can be compared to look for common features that overlap with each other and can be linked together (superimposed).

The fingerprints may be used to manage the user's social network connections, e.g., recommend or connect to other online communities or websites (e.g., on the Internet, World Wide Web), for example, focused specifically to match the user's level of interest. The fingerprint information may be used to determine the user's level of understanding of a topic or the user's position on the topic may be determined. At 114, the user's fingerprint may be compared with information associated with online communities. As an example, folksonomy of online communities, e.g., social network sites, online courses, eBooks read may be used to match the fingerprints. The online communities (e.g., on the Internet or the like) may be those places the user has previously visited, or on a list of predefined sites. The folksonomy of the online communities shows tagged and classified content of those communities.

Examples of such sites may include a course on eLearning, an online community on patents, an activity stream, board or wall of a social network application site. Based on the comparing of the fingerprint with online communities, different sites may be recommended to the user at 116. For instance, as the points of the fingerprint increase/decrease, the methodology of the present disclosure in one embodiment may recommend to a user what group or social network to join. For example, if points for using embodiment are low, then the methodology of the present disclosure in one embodiment may recommend; "Introduction to Inventors" wiki; If points for using embodiment are high, then the methodology of the present disclosure in one embodiment may recommend; "How to become a Master Inventor" community.

The folksonomy or information about the online communities may include classified or tagged information about the content of the online communities. The tagged or classified information also may have a threshold value or a range of threshold values associated with the information. For instance, using the above example, "Introduction to Inventors" wiki may have the word "embodiment" as tagged or classified information with a threshold value of X. If the user's fingerprint has a phrase (e.g., N-Gram) that includes the word "embodiment" with points lower than the threshold value X associated with the "Introduction to Inventors" wiki, this wiki site may be selected for recommending to the user to join. Similarly, "How to become a Master Inventor" online community may have a tagged element that is "embodiment" with an associated threshold value of Y. If the user's fingerprint has a phrase that includes the word "embodiment" with points exceeding the threshold value Y, this online community may be selected for recommending to the user to join. In this way, a user's fingerprint information may be compared with the information about the online communities to provide suggestions or recommendations to the user. For example, if the weighted value of the word "embodiment" is identified within a novice level value, a recommendation may be to Introduction to Inventing, versus the opposite, higher value, which would be "Becoming a Master Inventor."

As another example, the recommending may include recommending to remove an existing community based on changes in the user's social network interactions.

Figure 2:
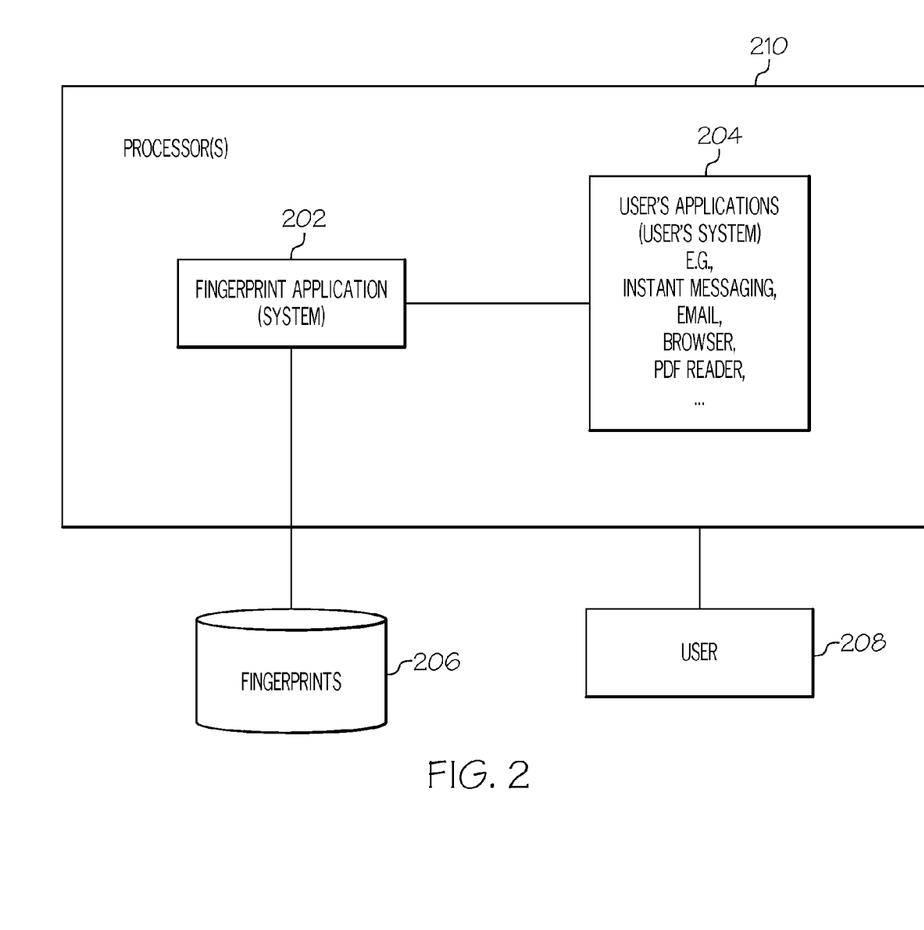
FIG. 2 is a block diagram that illustrates components of fingerprint system in one embodiment of the present disclosure.

FIG. 2 is a block diagram that illustrates components of fingerprint system in one embodiment of the present disclosure. Fingerprint application 202 of the present disclosure in one embodiment may create a user's fingerprint, e.g., based on the user 208 interacting with others via various computer-implemented applications 204 that allow the user 208 to communicate, for example, instant messaging (IM) application, electronic mail (email), web browser, pdf reader, and various social media or social networking applications. The fingerprint application 202 may connect to one or more of the user applications 204, e.g., via an application programming interface, a journaling application or system, a plug-in application (e.g., a plug-in to a browser), an application running in the background that captures data from the user's applications 204, or the like application that allow interfacing with the user's application 204 to access various data from the user's application 204. The fingerprint application 202 and the user's applications 204 may run or execute on one or more hardware processors 210. If more than one hardware processor is involved, the fingerprint application 202 and the user's application 204 may run on different processors, which processors may be connected locally, or remotely, e.g., distributed remotely across a computer network. The processors 210 may also be part of a communication device such as a smartphone, tablet, television (TV), and/or others.

As described with reference to FIG. 1, fingerprint is created and assigned to a user 208. The fingerprint application 202 may be connected to applications running on the user's computer system, e.g., applications such as IM, email, browser, PDF reader, etc., and communications devices (smartphone, tablet, TV, others), which may also run such applications. The fingerprint application 202 recognizes a phrase on an application 204, e.g., using one or more data analytics techniques, and creates a fingerprint of the phrase (N-Gram). The fingerprint may include the following metrics to a word (new or existing), definition and contextual use of the word, who the user was communicating with when the word was used, the number of times used, how long since the last time the word was used. Such information may be obtained from the header information or other metadata information associated with the communication or conversation, e.g., email or IM headers that include the time, sender, recipient, and other information. Various text mining techniques can be used to determine definition of a word and its context.

If a new word is detected then it may be assigned a weight and context. If previously detected word is encountered again, then the weight and context information may be stored and linked to the word itself. The same word may be mapped to different values: embodiment ->used in the context of "what is an embodiment?", which may be mapped to a weight associated with novice level; embodiment->used in context of "in this embodiment, I describe", which may be mapped to a weight associated with expert level.

The created fingerprint is stored, e.g., in a database or a storage device 206. In one embodiment, the fingerprint application 202 may monitor the user's interactions in real-time continuously or periodically, updating the user's fingerprint (e.g., that is stored in the storage device), with updated information, for example, additional phrases, updated point values for existing phrases that are used again or repeated in subsequent conversations (or interactions).

Based on the fingerprint that is created, e.g., and stored in the storage device, the fingerprint application may suggest to the user one or more communities, e.g., a social network, content or other information. For instance, ontologies or classification of information associated with the online communities, content or other information, may be compared with the fingerprint (e.g., phrases). Based on the similarities between the fingerprint and the classified information associated with the online communities, content or other information, one or more of those online communities, content or other information may be suggested. Techniques such as sentiment analysis and text/data mining can be used to determine contextual similarities between words/phrases. Sentiment analysis techniques can also be used to determine the "feel" of the word used based on context.

A user interface may be provided to interface with the fingerprint application, for example, that supports user options to save, adjust, modify, share, restrict, apply, combine, and access the phrase elements.

In one embodiment, the fingerprint application can also superimpose fingerprints to generate suggestions based on collection of fingerprints. Superimposition can be based on one or more metrics or unique sources.

In one aspect, fingerprint, e.g., stored in a storage device 206, may be shared with a group of users. For instance, if there are a group of users that share the same level of expertise or other, for example, "group new to inventing", the users can share the fingerprint labeled for novice inventor.

In another aspect, the fingerprint application 202 may use policies and security and/or privacy constraints in determining which phrases or information should be saved as fingerprints. For instance, e.g., via a setting, a user may turn on or off a feature that can be used in the user's fingerprint.

Yet in another aspect, a level of granularity can be included to the fingerprint based on where and/or when the word was last used. For example, assigned points or weight may decay based on one or more factors, e.g., the time of usage. For example, a word used 10 times a month ago might have less weight than a word used 10 times a day ago.

Still in another aspect, the fingerprint can be generated over a period of set time or based on the number of occurrences. For example, the user's activity stream or conversation or the like may be monitored for a defined set time and the data from that period of time may be analyzed to extract the fingerprint information. As another example, the user's activity stream or conversation or the like may be monitored until a defined number of occurrences of one or more phrases are identified. The data from that monitored period may be analyzed to extract the fingerprint information.

Further in another aspect, the fingerprint can be generated combined with other inputs such as location, to provide recommendations. For example, knowing which location a given user is postings from, may allow the fingerprint application to focus on suggesting an online community which correlates to the given location.

In one aspect, the fingerprint application may monitor changing phrases that are stored as fingerprints. For instance, as the language of the user changes in the user's interactions, different phrases may be identified and stored as part of the fingerprint. Older phrases converted to features that no longer occur (e.g., phrases that the user has not used in the past set period) may be designated as obsolete and the connections (e.g., online communities, content) that were recommended based on those older phrases may no longer be recommended, and different recommendations may be provided based on the currently used phrases. Thus, for example, as the user's language changes, the recommended connections can change. For example, based on the development of the changing language, a recommendation may change from a novice community to an expert community.

In another aspect, in generating fingerprints, one or more constraints may be applied, for example, users, groups or languages of speakers. For example, constraints may be applied to limit or filter data that is used for evaluating connections. For instance, users may choose to ignore recommendations regarding their connections with one or more other users, groups, etc.

Yet in another aspect, the fingerprinting could also be used to select the likely participants from the user's online social network (OSNs) for targeted communications. For example, features from fingerprints may be used to direct communications. E.g., User A, User B and User C may have a common feature, feature-c, in their fingerprints. Information may be directed to those users with common feature-c, for example, via email, posts, and/or other communications.

The methodology of the present disclosure may improve online communications, online networking experience, and online user experience in interacting with online communities on the Internet.

Figure 3:
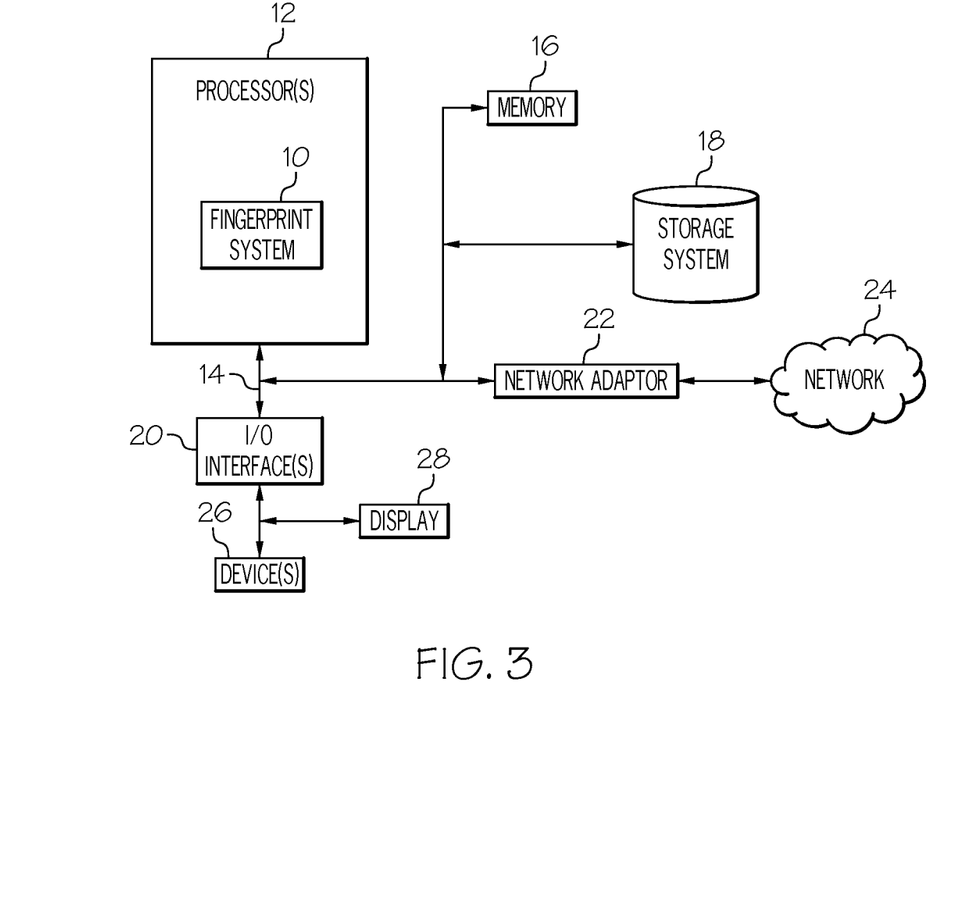
FIG. 3 illustrates a schematic of an example computer or processing system that may implement the fingerprint system in one embodiment of the present disclosure.

FIG. 3 illustrates a schematic of an example computer or processing system that may implement the fingerprint system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system for natural language management of online social network connections, comprising:
    a hardware processor operable to receive natural language data associated with a user's social network interactions;

the hardware processor further operable to analyze the natural language data associated with the user's social network interactions;

the hardware processor further operable to determine features used in the user's social network interactions based on the analysis;

the hardware processor further operable to assign point values to the features used in the user's social network interactions;

the hardware processor further operable to create a fingerprint of the user based on the features and the point values;

the hardware processor further operable to compare the fingerprint with information associated with online communities;

the hardware processor further operable to determine context in which the features are used in the user's social network interactions, wherein the point values are assigned based on the determined context;

based on the comparing, the hardware processor further operable to recommend one or more of the online communities as the user's potential social network connections; and a storage device operable to store the fingerprint, wherein the features comprise a sequence of a number of items from the natural language data associated with the user's social network interactions, wherein the fingerprint represents one or more of words the user uses and a context in which the user uses the one or more of words, wherein the fingerprint is used to connect to an online community or a website, or combination thereof.

2. The system of claim 1, wherein the determined context comprises a number of times the features are used in the user's social network interactions, with whom the user's social network interactions are conducted, definition and contextual use of the features, and how long ago the features were used.

3. The system of claim 1, wherein the created fingerprint is augmented with superimposed features.

4. The system of claim 1, wherein the online communities comprise one or more of the user's previously visited online communities and a predefined list of online communities.

5. A computer readable storage medium storing a program of instructions executable by a machine to perform a method of natural language management of online social network connections, the method comprising:

receiving natural language data associated with a user's social network interactions;

analyzing the natural language data associated with the user's social network interactions;

determining features used in the user's social network interactions based on the analysis;

assigning point values to the features used in the user's social network interactions;

creating a fingerprint of the user based on the features and the point values;

comparing the fingerprint with information associated with online communities;

based on the comparing, recommending one or more of the online communities as the user's potential social network connections; and determining context in which the features are used in the user's social network interactions, wherein the point values are assigned based on the determined context, wherein the features comprise a sequence of a number of items from the natural language data associated with the user's social network interactions, wherein the fingerprint represents one or more of words the user uses and a context in which the user uses the one or more of words, wherein the fingerprint is used to connect to an online community or a website, or a combination thereof.

6. The computer readable storage medium of claim 5, wherein the fingerprint is created based on monitoring the user's social network interactions over a specified period of time.

7. The computer readable storage medium of claim 5, wherein the fingerprint is created based on monitoring the user's social network interactions until a defined number of occurrences of one or more of the features have been detected.

8. The computer readable storage medium of claim 5, wherein the fingerprint is created further based on location information associated with the user received as input.

9. The computer readable storage medium of claim 5, wherein said one or more of the online communities recommended as the user's potential social network connections changes as a natural language used in the user's social network interactions changes.

* * * * *